United States Patent
Kim et al.

(10) Patent No.: US 10,468,753 B2
(45) Date of Patent: Nov. 5, 2019

(54) ELECTRONIC DEVICE

(71) Applicant: Samsung Electronics Co., Ltd., Suwon-si, Gyeonggi-do (KR)

(72) Inventors: Yoon-Geon Kim, Seoul (KR); Seung-Tae Ko, Bucheon-si (KR); Sang-Ho Lim, Suwon-si (KR); Won-Bin Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 15/275,959

(22) Filed: Sep. 26, 2016

(65) Prior Publication Data

US 2017/0093021 A1     Mar. 30, 2017

(30) Foreign Application Priority Data

Sep. 25, 2015   (KR) .................. 10-2015-0136849

(51) Int. Cl.
*H01Q 1/24* (2006.01)
*H01Q 7/00* (2006.01)
*G06F 1/16* (2006.01)
*H01F 5/00* (2006.01)
*H01F 5/04* (2006.01)
(Continued)

(52) U.S. Cl.
CPC .......... *H01Q 1/243* (2013.01); *G04G 21/04* (2013.01); *G06F 1/163* (2013.01); *G06F 1/1698* (2013.01); *H01F 5/003* (2013.01); *H01F 5/04* (2013.01); *H01F 27/02* (2013.01); *H01F 27/34* (2013.01); *H01Q 1/273* (2013.01); *H01Q 1/36* (2013.01); *H01Q 1/38* (2013.01); *H01Q 1/42* (2013.01);
(Continued)

(58) Field of Classification Search
CPC .... H01Q 1/2208; H01Q 1/2216; H01Q 1/241; H01Q 1/242; H01Q 1/243; H01Q 1/245; H01Q 1/273; H01Q 1/528; H01Q 7/00; H01Q 1/36; H01Q 1/38; H01F 5/003; H01F 5/04; H01F 27/02; H01F 27/34; G06F 1/163; G06F 1/1698
See application file for complete search history.

(56) References Cited

U.S. PATENT DOCUMENTS 5,408,699 A    4/1995   Yamashita et al.
7,847,753 B2 *  12/2010  Ishibashi ............... H01Q 1/243
                                                343/702

(Continued)

FOREIGN PATENT DOCUMENTS

CN    101180765 A    5/2008
CN    201898208 U    7/2011
(Continued)

OTHER PUBLICATIONS

Chinese office action dated Jun. 5, 2019; Application/Patent #: 201680055258.9; Issuing #: 2019053101830790.

*Primary Examiner* — Daniel Munoz
*Assistant Examiner* — Patrick R Holecek
(74) *Attorney, Agent, or Firm* — Jefferson IP Law, LLP (57) ABSTRACT

An electronic device is provided. The electronic device includes a housing formed of a conductive material and a coil adjacent to the housing. The coil is configured to generate a flow of current along a first direction, and the coil may be electrically connected with the housing to generate a flow of current in a direction parallel with the first direction from a portion of the housing.

19 Claims, 7 Drawing Sheets (51) Int. Cl.
*H01Q 1/27* (2006.01)
*H01Q 1/36* (2006.01)
*H01Q 1/38* (2006.01)
*H01Q 1/42* (2006.01)
*H01Q 1/50* (2006.01)
*H01F 27/02* (2006.01)
*H01F 27/34* (2006.01)
*G04G 21/04* (2013.01)
*H01Q 1/52* (2006.01)

(52) U.S. Cl.
CPC ............... *H01Q 1/50* (2013.01); *H01Q 7/00* (2013.01); *H01Q 1/528* (2013.01)

(56) References Cited

U.S. PATENT DOCUMENTS

| | | | |
|---|---|---|---|
| 9,793,595 B1* | 10/2017 | Padin | H01Q 1/22 |
| 2005/0180082 A1 | 8/2005 | Nakamura et al. | |
| 2009/0051620 A1 | 2/2009 | Ishibashi et al. | |
| 2011/0050531 A1* | 3/2011 | Yamaguchi | H01Q 1/2216 343/842 |
| 2013/0059532 A1* | 3/2013 | Mahanfar | H04B 5/0031 455/41.1 |
| 2013/0099994 A1 | 4/2013 | Yosui | |
| 2013/0154388 A1 | 6/2013 | Kato et al. | |
| 2014/0014733 A1 | 1/2014 | Kato | |
| 2014/0218262 A1 | 8/2014 | Tsubaki | |
| 2014/0247188 A1 | 9/2014 | Nakano et al. | |
| 2016/0072303 A1* | 3/2016 | Jeong | H01Q 1/243 307/104 |
| 2016/0205228 A1 | 7/2016 | Orihara et al. | |

FOREIGN PATENT DOCUMENTS

| | | |
|---|---|---|
| CN | 102569987 A | 7/2012 |
| CN | 103370886 A | 10/2013 |
| CN | 104767033 A | 7/2015 |
| CN | 204651474 U | 9/2015 |
| EP | 0484558 A1 | 5/1992 |
| JP | 2013-077967 A | 4/2013 |
| JP | 2015-046768 A | 3/2015 |
| WO | 2015/137609 A1 | 9/2015 |

* cited by examiner

ELECTRONIC DEVICE

CROSS-REFERENCE TO RELATED APPLICATION(S)

This application claims the benefit under 35 U.S.C. § 119(a) of a Korean patent application filed on Sep. 25, 2015 in the Korean Intellectual Property Office and assigned Serial number 10-2015-0136849, the entire disclosure of which is hereby incorporated by reference.

TECHNICAL FIELD

The present disclosure relates to electronic devices. More particularly, the present disclosure relates to electronic devices that may transmit and receive wireless signals.

BACKGROUND

Generally, the term "electronic device" may refer to a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, etc. For example, electronic devices may output stored information as voices or images. As electronic devices are becoming highly integrated, and high-speed and high-volume wireless communication become commonplace, an electronic device, such as a mobile communication terminal, is recently being equipped with various functions. For example, an electronic device may come with an integrated functionality, including an entertainment function, such as playing video games, a multimedia function, such as replaying music/videos, a communication and security function for mobile banking, and a scheduling or e-wallet function.

Such electronic devices may perform wireless communication with antenna devices. For example, an electronic device may include various antenna devices, such as an antenna device for near field communication (NFC) for the functionality of, e.g., an electronic card, an antenna device for access to, e.g., a local area network (LAN), or an antenna device for access to a commercial communication network. As such, as development of electronic/information communication technology enables various antenna devices to be equipped in an electronic device, the electronic device may secure the optimal communication environment by selecting an antenna device appropriate for the user environment or operation mode.

The above information is presented as background information only to assist with an understanding of the present disclosure. No determination has been made, and no assertion is made, as to whether any of the above might be applicable as prior art with regard to the present disclosure.

SUMMARY

Compact electronic devices may have difficulty in securing a space for arrangement of antenna devices. Further, the need for arrangement of multiple antenna devices (or radiating conductors) for simultaneous operation on a number of different frequency bands renders it difficult for compact electronic devices to secure space or room for installation of such antenna devices.

Aspects of the present disclosure are to address at least the above-mentioned problems and/or disadvantages and to provide at least the advantages described below. Electronic devices adopting metal as their housing material for improved aesthetics and better anti-shock property are also subject to difficulty in incorporating improved performance of antenna devices. For example, a metallic housing member may be an obstacle to transmission/reception of antenna devices.

In accordance with an aspect of the present disclosure, an electronic device that may minimize a wireless communication failure due to interference by such metallic housing member is provided.

In accordance with another aspect of the present disclosure, an electronic device with a reduced space for installation of antenna devices is provided.

In accordance with another aspect of the present disclosure, an electronic device including a housing formed of a conductive material and a coil provided adjacent to the housing is provided. The coil is configured to generate a flow of current along a first direction. In addition, the coil may be electrically connected with the housing to generate a flow of current in a direction parallel with the first direction from a portion of the housing.

In accordance with another aspect of the present disclosure, the electronic device may generate a flow of current in the same direction as that of the coil in a portion of the housing, suppressing an influence from an induced current generated from the metallic housing when utilizing the coil as an antenna device. Generally, when a current is applied to a coil, an induced current may be generated in a metal member (e.g., a conductive member) positioned adjacent to the coil in a different direction from that of the coil (e.g., an opposite direction). Such induced current may be the cause of a performance deterioration occurring when the coil is utilized as an antenna device. According to an embodiment of the present disclosure, the electronic device may allow current generated from the housing and current generated from the coil to flow in the same direction, suppressing an influence from an induced current while enhancing the performance of antenna device. Further, the housing formed of a metal may present an aesthetically improved outer look.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure a will be more apparent from the following description in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

The terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude various embodiments of the present disclosure.

According to an embodiment of the present disclosure, the electronic device may include a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a television (TV), a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the present disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless LAN (WLAN), a wide area network (WAN), the Internet, or a small area network (SAN).

Figure 1:
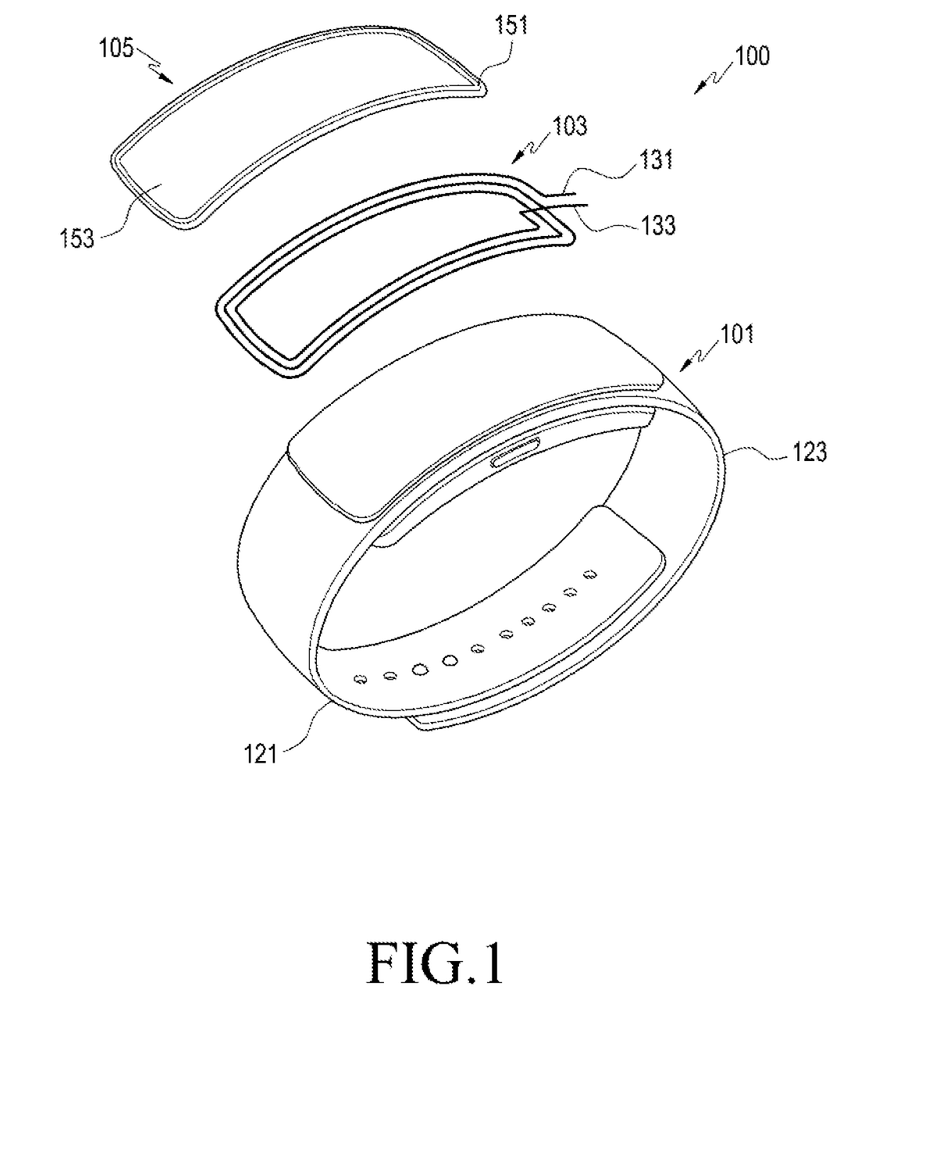
FIG. 1 is an exploded perspective view illustrating an electronic device according to an embodiment of the present disclosure.

FIG. 1 is an exploded perspective view illustrating an electronic device according to an embodiment of the present disclosure.

According to an embodiment of the present disclosure, an example in which the electronic device is a smart watch is described. However, the electronic device is not limited to the smart device, and the electronic device may rather be various electronic devices wearable on the user's body, as well as a portable electronic device, such as a mobile communication terminal.

Referring to FIG. 1, the electronic device 100 may include wearing portions 121 and 123 provided at both sides (or both ends) of the housing 101 and extending in directions away from each other. The wearing portions 121 and 123 may be coupled together while partially overlapping each other to enable the electronic device 100 to be worn on the user's body (e.g., a wrist). The housing 101 may be formed of a conductive material (e.g., a metallic material) or a portion or portions of the housing 101, such as the edge of the housing 101, may be formed of a conductive material. The housing 101 may include various circuit devices, such as a processor (e.g., an application processor (AP)), a communication module, a memory, and a battery, and may further include a display device 105 mounted on a surface thereof. The display device 105 may include a liquid crystal display (LCD), a light emitting diode (LED) display, an organic LED (OLED) display or plastic OLED (POLED), or a microelectromechanical systems (MEMS) display, or an electronic paper display. The display device 105 may output various contents (e.g., pictures or videos) and may output execution screens of various applications (e.g., game, internet banking, or scheduling application) by the user's manipulation.

A window member 153 is provided on a front surface of the housing 101 to protect the display device 105. The window member 153 may be formed of a transparent material or substance, e.g., glass or synthetic resin (e.g., acrylic or polycarbonate) to protect the display device 153 from the external environment while transmitting images of screens outputted from the display device 105. When the electronic device 100 includes touchscreen functionality, a touchscreen panel may be installed on the display device 105. The touchscreen panel may be integrated with the display device 105. The display device 105 may have a bezel 151 forming the edge of the display device 105. The bezel 151 may be formed of a metal to present an improved aesthetic outer appearance.

With reference to FIG. 1, the electronic device 100 may include a coil 103. The coil 103 may be positioned in an inner surface of the display device 105 and received in the housing 101. The coil 103 may be disposed adjacent to the edge of the display device 105 and/or on a surface of the display device 105. The coil 103 may be utilized for near field communication (NFC) of the electronic device 100. The coil 103 may include an input portion 131 and an output portion 133, and the coil 103 and may be connected to a circuit device (e.g., a communication module) embedded in the housing 101. The input portion 131 and the output portion 133 may be implemented of flexible printed circuit boards, and according to an embodiment of the present disclosure, they may be implemented of coaxial cables. The input portion 131 and the output portion 133 may connect the coil 103 to the circuit device of the electronic device for feeding power.

Figure 2:
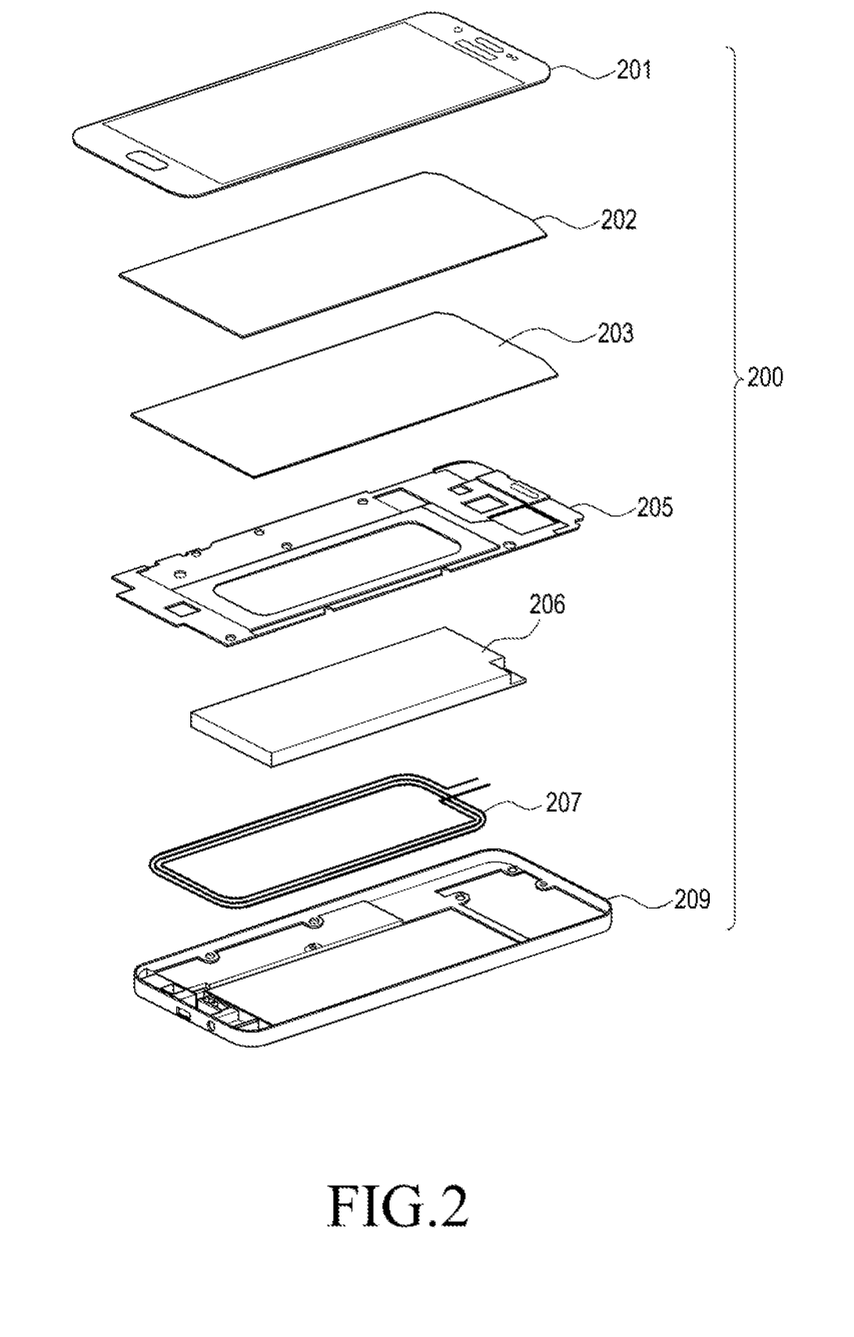
FIG. 2 is an exploded perspective view illustrating an electronic device according to an embodiment of the present disclosure.

FIG. 2 is an exploded perspective view illustrating an electronic device according to an embodiment of the present disclosure.

Referring to FIG. 2, according to an embodiment of the present disclosure, the electronic device 200 may include a front cover 201, a touchscreen panel 202, a display device 203, a supporting member 205, a battery 206, a housing 209, and a coil 207. Described is an example in which the electronic device 200 is a smartphone (for illustrative purpose) and is not limited thereto.

The front cover 201 may form a front surface of the electronic device 200 and protect the inside of the electronic device 200. The front cover 201 may be formed of glass or synthetic resin (e.g., acrylic or polycarbonate) to protect the display device 203 from the external environment while transmitting images of screens outputted from the display device 203. In this embodiment, the front cover 201 has a flat plate shape, for example. However, the front cover 201 may have a stereoscopic shape with both side ends thereof curved.

The touch panel (e.g., a touchscreen panel) 202 may be disposed in an inner surface of the front cover 201 to function as an input device. The touch panel 202 may be formed with the front cover 201 in a single body.

The display device 203 may include a liquid crystal display (LCD), a light emitting diode (LED) display, an organic light emitting diode (OLED) display or plastic OLED (POLED), or a microelectromechanical systems (MEMS) display, or an electronic paper display. The display device 203 may output various contents (e.g., pictures or videos) and may output execution screens of various applications (e.g., game, Internet banking, or scheduling application) by the user's manipulation. The display device 203, together with the touch panel 202, may be formed in a single body, and it, along with the front cover 201 integrated with the touch panel 202, may be formed in a single body. For example, the front cover 201, the touch panel 202, and the display device 203 may have a structure in which they are sequentially stacked in a one-above-another mariner However, the electronic device 200 is not limited to such structure where the front cover 201, the touch panel 202, and the display device 203 are sequentially stacked.

Referring to FIG. 2, the supporting member 205 is provided on a rear surface of the display device 203 to support the display device 203 while providing stiffness to the inside of the electronic device 200. The supporting member 205 may be formed of a metallic material, but is not limited thereto. For example, the supporting member 205 may be formed of other various materials, such as plastics or other suitable material.

The battery 206 may be disposed on a rear surface of the supporting member 205 to provide necessary power to the electronic device 200.

The housing 209 may be disposed on a rear surface of the battery 206 to protect the rear surface of the electronic device 200. The housing 209 may be formed of a metal, or a portion of a side surface of the housing 209 (e.g., the edge of the housing) may be formed of a metal. The housing 209 may include a circuit board on which the chipset, communication module, storage module or other electronic parts of the electronic device 200 are mounted.

The coil 207 may be disposed along an inner surface of the housing 209 while being spaced apart from the inner surface of the housing 209 and the coil 207 may be utilized for near field communication (NFC) of the electronic device 200. Further, according to an embodiment of the present disclosure, the coil 207 may be disposed on the display device 203. According to an embodiment of the present disclosure, the touch panel 202 may be disposed to face the display device 203, with the coil 207 disposed therebetween. According to an embodiment of the present disclosure, the coil 207 may be disposed to face the display device 203 with the touch panel 202 disposed therebetween.

Figure 3:
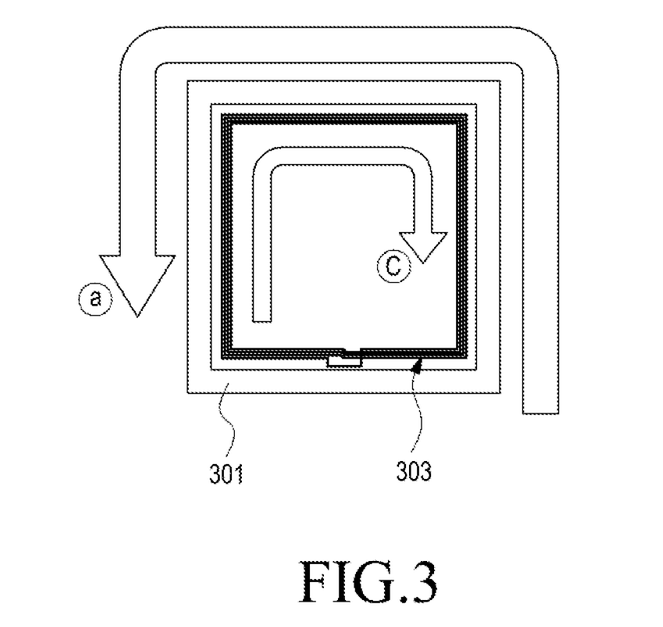
FIG. 3 is a view illustrating an induced current formed in a metallic member when a current is applied to a coil according to an embodiment of the present disclosure.

FIG. 3 is a view illustrating an induced current formed in a metallic member when a current is applied to a coil according to an embodiment of the present disclosure.

Referring to FIG. 3, the typical electronic device may include a housing 301 and a coil 303 disposed adjacent to the housing 301.

A side surface of the housing 301 may be formed of a metal material. When current is supplied to the coil 303, the coil 303 may generate a first magnetic field by a current flowing along a first direction, e.g., a clockwise direction (ⓒ). The first magnetic field may be used for NFC of the electronic device.

The metallic side surface of the housing 301 may create an induced current by the first magnetic field. The induced current may flow along an opposite direction of the first direction, e.g., counterclockwise direction (ⓐ), thereby creating a second magnetic field in an opposite direction of the direction of the first magnetic field. As the second magnetic field cancels out the first magnetic field, the first magnetic field in the coil 303 weakens, deteriorating the NFC performance of the electronic device. Means to address such issue(s) is described below with reference to the drawings.

Figure 4:
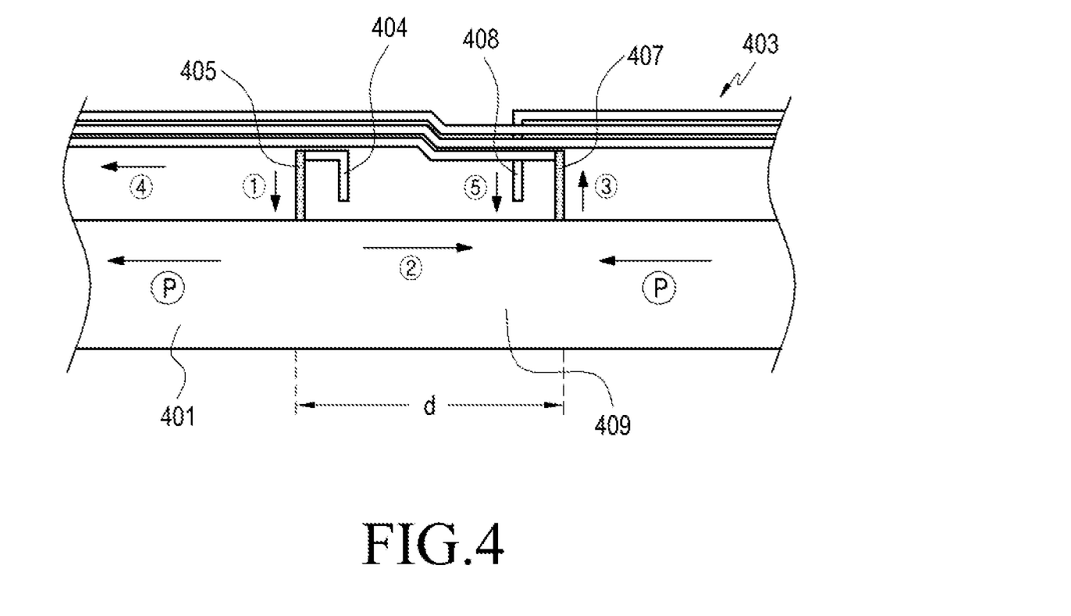
FIG. 4 is a view illustrating an example in which a coil and housing of an electronic device are electrically connected together according to an embodiment of the present disclosure.

FIG. 4 is a view illustrating an example in which a coil and housing of an electronic device are electrically connected together according to an embodiment of the present disclosure.

Referring to FIG. 4, according to an embodiment of the present disclosure, the electronic device may include a housing 401, a coil 403 (e.g., the coil 103 of FIG. 1 or coil 203 shown in FIG. 2), a first connecting portion 405, and a second connecting portion 407.

The housing 401 may be the housing 101 of FIG. 1 or the housing 201 shown in FIG. 2 as described above in connection with the prior embodiments. The housing 401 may be formed of a metal material, or a portion of a side surface of the housing 401 may be formed of a metal material. The metallic housing 401 may present an improved aesthetic outer appearance.

The coil 403 may be disposed adjacent to the housing 401 and may be electrically connected with an input portion 404 for introducing current into the coil 403 and an output portion 408 for discharging current from the coil 403. The input portion 404 and the output portion 408 may be electrically connected with a circuit device mounted in the housing 401 to cause a current flow across the coil 403 in the first direction.

The first connecting portion 405 connects the input portion 404 with the housing 401 to allow a first current (①) to flow from the input portion 404 to the housing 401. Further, the first connecting portion 405 is substantially a portion of the coil 403 and mechanically disconnected from the rest of the coil 403 while electrically connecting to the input portion 404. The first connecting portion 405 is not limited as a portion of the coil 403 being mechanically disconnected from the rest of the coil 403 while connected to the input portion 404, and an end of the coil 403 may be connected with the input portion 404.

With reference to FIG. 4, the first current (①) may include a housing current (Ⓟ) flowing in a direction parallel with the first direction and a second current (②) flowing in an opposite direction of the first direction. That is, the first current (①) may be branched into the housing current (Ⓟ) and the second current (②). The housing current (Ⓟ) may move to the second connecting portion 407 while flowing in the first direction along the housing 401. Further, the second current (②) may merge with the housing current (Ⓟ) and move to the second connecting portion 407 while flowing in an opposite direction of the first direction.

The second connecting portion 407 may connect the housing 401 with the coil 403 to allow a third current (③) to flow from the housing 401 to the coil 403. That is, the third current (③) may be a sum of the housing current (Ⓟ) and the second current (②). The third current (③) may cause a fourth current (④) that flows along the coil 403 in the first direction. The fourth current (④) may cause a fifth current (⑤) that flows to the output portion 408 connected with the coil 403.

As such, as the coil 403 is electrically connected with the housing 401 to generate a flow of current in a direction parallel with the first direction in at least a portion of the housing, and an induced current generated from the housing 401 may be suppressed by a magnetic field generated from the coil 403. That is, as the housing current (Ⓟ) flows in parallel with the first direction of the current flowing across the coil 403, an induced current canceling out a magnetic field from the coil 403 may be suppressed from being generated.

Meanwhile, the second current (②) is rendered to flow across the housing 401 between the first connecting portion 405 and the second connecting portion 407 in an opposite direction of the first direction, and the magnetic field from the coil 403 may be canceled out. According to an embodiment of the present disclosure, the amount of second current (②) may be reduced by an arrangement of the first connecting portion 405 and the second connecting portion 407. That is, the amount of second current (②) which cancels out a magnetic field from the coil 403 may be reduced by decreasing the gap (d) between the first connecting portion 405 and the second connecting portion 407 in a section where a flow of second current (②) is generated.

According to an embodiment of the present disclosure, the electronic device may include an insulator 409 for insulating the first connecting portion 405 from the second connecting portion 407 in a remaining portion of the housing 401, e.g., a portion or section of the housing 401 where current flows in an opposite direction of the first direction. For example, the second current (②) may be prevented from being generated by insulating the section where the second current (②) may be created.

Figure 5:
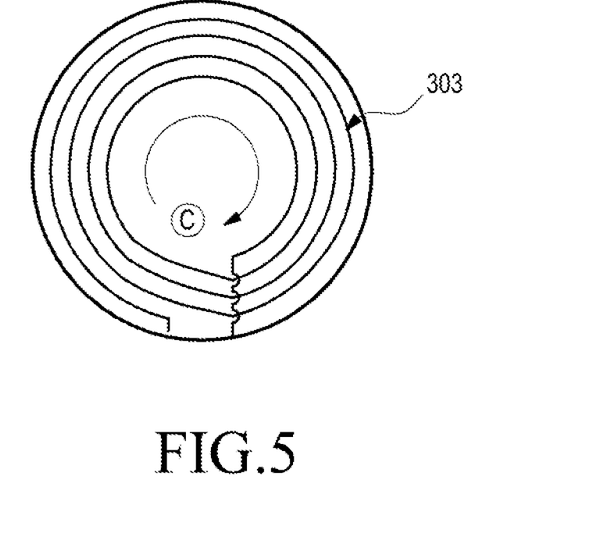
FIG. 5 is a view illustrating a coil of a typical electronic device according to an embodiment of the present disclosure.

FIG. 5 is a view illustrating a coil of a typical electronic device according to an embodiment of the present disclosure.

Referring to FIG. 5, the coil 303 of the typical electronic device may be powered to cause a flow of current along the first direction (e.g., clockwise (ⓒ)) and may perform near field communication (NFC) through a first magnetic field generated by the current.

Figure 6:
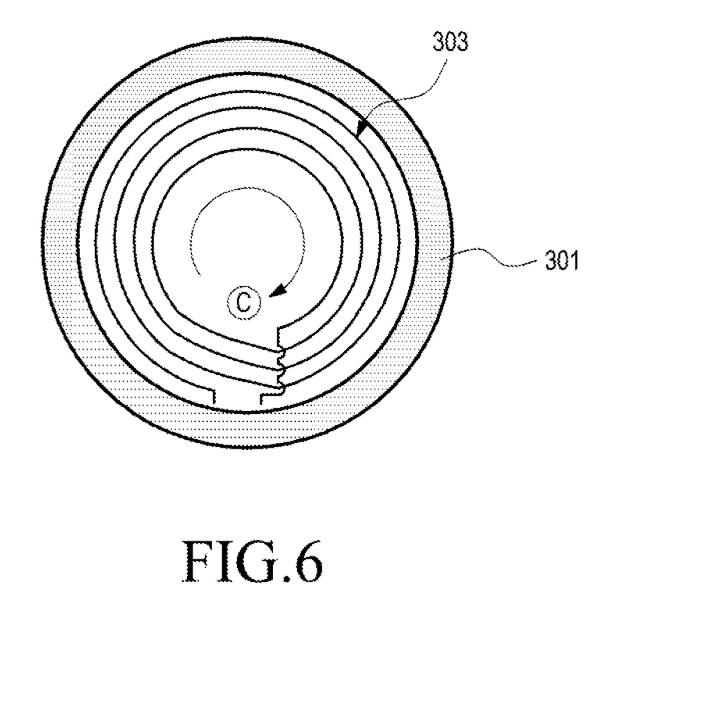
FIG. 6 is a view illustrating a coil and housing of a typical electronic device according to an embodiment of the present disclosure.

FIG. 6 is a view illustrating a coil and housing of a typical electronic device according to an embodiment of the present disclosure.

Referring to FIG. 6, the coil 303 of the typical electronic device, as set forth above, may cause an induced current in an opposite direction of the first direction (ⓒ) in the metallic housing 301, and a second magnetic field generated by the induced current may deteriorate the performance of the first magnetic field.

Figure 7:
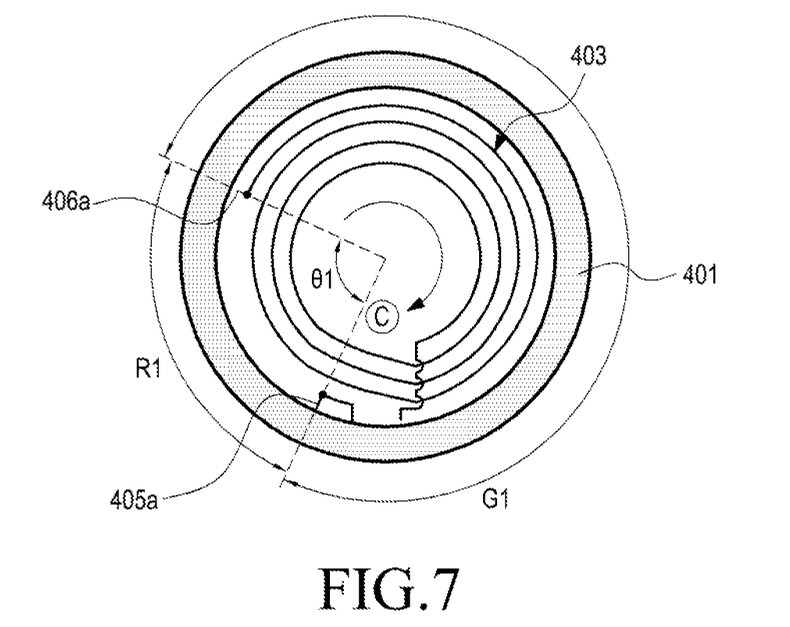
FIG. 7 is a view illustrating an example in which a coil and housing of an electronic device are electrically connected together according to an embodiment of the present disclosure.

FIG. 7 is a view illustrating an example in which a coil and housing of an electronic device are electrically connected together according to an embodiment of the present disclosure.

Referring to FIG. 7, a first connecting portion 405a may be spaced apart from a second connecting portion 406a by a first angle θ1 with respect to the center of the coil 403. The first connecting portion 405a may cause a current to flow from the coil 403 to the housing 401. The current from the first connecting portion 405a may be branched into a current flowing to the second connecting portion 406a along the first direction (ⓒ) and a current flowing to the second connecting portion 406a along an opposite direction of the first direction. For example, a portion R1 of the housing 401 where current flows from the first connecting portion 405a to the second connecting portion 406a along the first direction ($\circlearrowleft$) may allow current to flow in a direction parallel with the direction of the current flowing across the coil 403, thereby preventing near field communication from being influenced by a first magnetic field from the coil 403. Another portion G1 of the housing 401 where current flows from the first connecting portion 405a to the second connecting portion 406a along an opposite direction of the first direction ($\circlearrowleft$) may allow current to flow in an opposite direction of the direction of the current flowing across the coil 403, thereby creating a second magnetic field in an opposite direction of the first magnetic field from the coil 403. The second magnetic field may deteriorate the performance of the first magnetic field from the coil 403.

Figure 8:
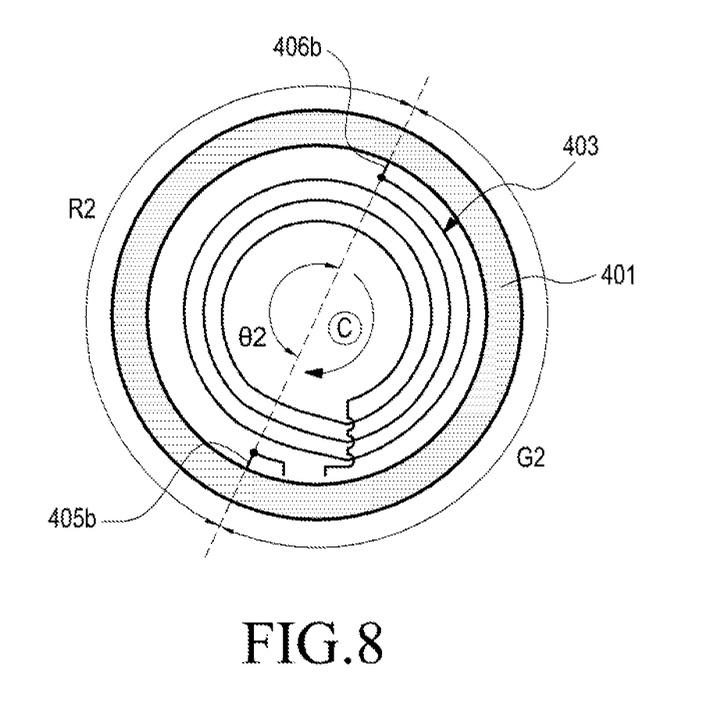
FIG. 8 is a view illustrating an example in which a coil and housing of an electronic device are electrically connected together according to an embodiment of the present disclosure.

FIG. 8 is a view illustrating an example in which a coil and housing of an electronic device are electrically connected together according to an embodiment of the present disclosure.

Referring to FIG. 8, a first connecting portion 405b may be spaced apart from a second connecting portion 406b by a first angle θ2 with respect to the center of the coil 403. The second angle θ2 may be larger than the first angle θ1. The portion R2 of the housing 401 where current flows in a direction parallel with the first direction may be larger than the portion R1 of the housing 401 shown in FIG. 7. Another portion G2 of the housing 401 where current flows in an opposite direction of the first direction may be smaller than the other portion G1 of the housing 401 of FIG. 7, and thus, the coil 403 shown in FIG. 8 may further reduce the occurrence of the second magnetic field than the coil 403 of FIG. 7 does.

Figure 9:
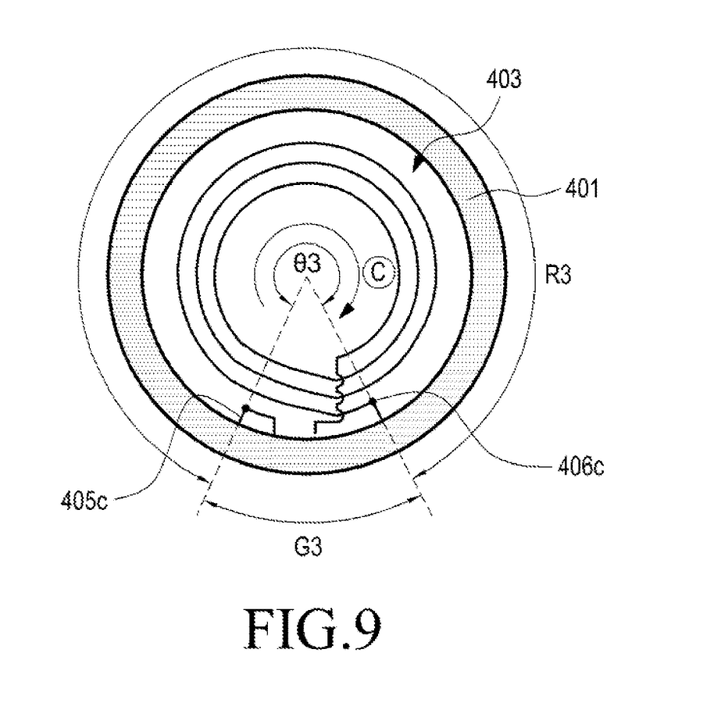
FIG. 9 is a view illustrating an example in which a coil and housing of an electronic device are electrically connected together according to an embodiment of the present disclosure.

FIG. 9 is a view illustrating an example in which a coil and housing of an electronic device are electrically connected together according to an embodiment of the present disclosure.

Referring to FIG. 9, a first connecting portion 405c may be spaced apart from a second connecting portion 406c by a second angle θ3 with respect to the center of the coil 403. The third angle θ3 may denote an angle by which the first connecting portion 406c and the second connecting portion 406c are spaced apart from each other along the first direction ($\circlearrowleft$) with respect to the center of the coil 403. The third angle θ3 may be larger than the first angle θ2. A portion R3 of the housing 401 where current flows in a direction parallel with the first direction may be larger than the portion R2 of the housing 401 shown in FIG. 8. Another portion G3 of the housing 401 where current flows in an opposite direction of the first direction may be smaller than the other portion G2 of the housing 401 of FIG. 8, and thus, the coil 403 shown in FIG. 9 may further reduce the occurrence of the second magnetic field than the coil 403 of FIG. 8 does. That is, the length of the housing from the second connecting portion 406c to the first connecting portion 405c along the first direction ($\circlearrowleft$) may be rendered to be smaller than the length of the housing from the first connecting portion 405c to the second connecting portion along the first direction ($\circlearrowleft$), reducing the occurrence of the second magnetic field.

Figure 10:
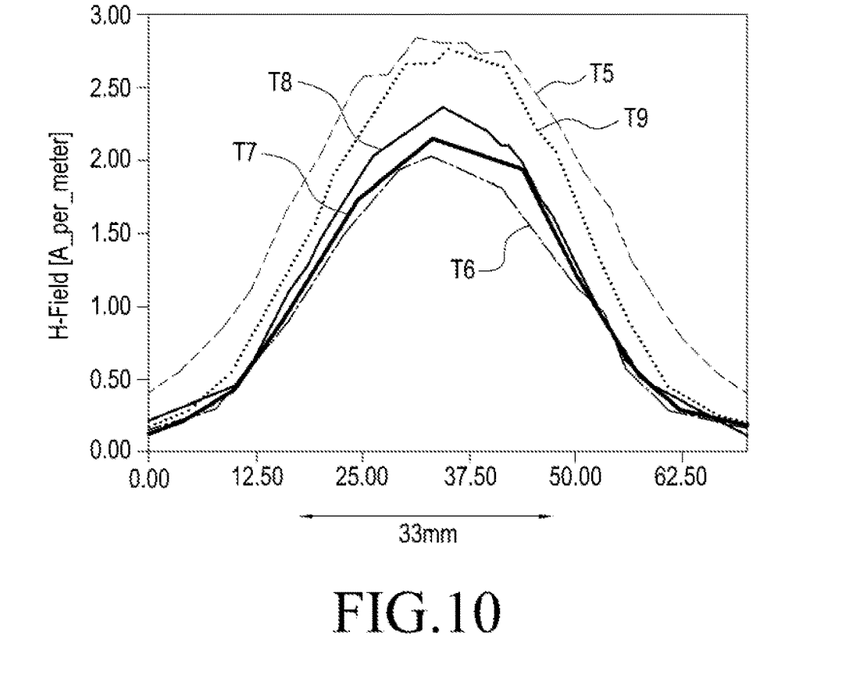
FIG. 10 is a graph illustrating a radiating performance of a coil as shown in FIGS. 5, 6, 7, 8, and 9 according to an embodiment of the present disclosure.

FIG. 10 is a graph illustrating a radiating performance of a coil as shown in FIGS. 5, 6, 7, 8, and 9 according to an embodiment of the present disclosure.

Referring to FIG. 10, FIG. 10 illustrates an example in which the coil 303 shown in FIG. 5 is not mounted in the metallic housing, wherein the second magnetic field interfering with the first magnetic field of the coil 303 is not generated to present a highest amount of first magnetic field (the graph denoted at T5). In contrast, the coil 303 shown in FIG. 6 presents an amount of first magnetic field (the graph denoted at T6) of the coil 303 by the second magnetic field generated from the metallic housing 301.

According to an embodiment of the present disclosure, the coil 403 of the electronic device is electrically connected with the housing 401, reducing the occurrence of the second magnetic field in the housing 401. As described above, the coil 403 shown in FIG. 9 is disposed adjacent to the metallic housing 401 and thus presents an amount of first magnetic field (the graph denoted at T9) smaller than that by the first coil 401 shown in FIG. 5 but presents a larger amount of first magnetic field (graphs denoted at T6 and T7) than that by the coil 401 shown in FIGS. 6 and 7. The amount of first magnetic field caused by the coil 403 shown in FIG. 8 is denoted at T8 in the graph of FIG. 10.

Figure 11:
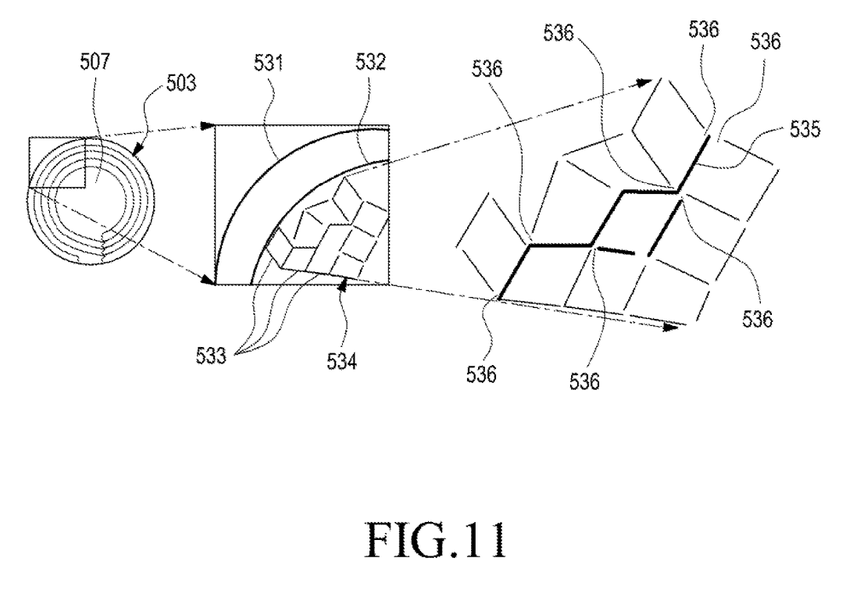
FIG. 11 is a view illustrating a coil of an electronic device according to an embodiment of the present disclosure.

FIG. 11 is a view illustrating a coil of an electronic device according to an embodiment of the present disclosure.

Referring to FIG. 11, according to an embodiment of the present disclosure, the electronic device may include a dielectric substrate 507 disposed on the display device and a mesh grid 534 including conductive wires 533 and formed on at least one surface of the dielectric substrate 507.

The dielectric substrate 507 may be disposed on a surface of the display device or inside the display device. The dielectric substrate 507 may be formed of a transparent (e.g., high light-transmittance) substance, e.g., polyimide or other polymer films. Further, the dielectric substrate 507 may be formed of an opaque film However, the dielectric substrate is not limited as formed of a film For example, the window member or front cover may be utilized as the dielectric substrate. The electronic device may include a touchscreen panel disposed on the display device, and the touchscreen panel may be disposed to face the display device with the dielectric substrate 507 disposed therebetween.

The mesh grid 534 may include conductive wires 533 arranged in a grid. Conductors forming the conductive wires 533 may include, e.g., copper (Cu), graphene, nanowire, indium-tin oxide (ITO), indium-zinc oxide (IZO), aluminum-zinc oxide (AZO), Ga-doped zinc oxide (GZO), zinc-tin oxide (ZTO), aluminum-zinc-tin oxide (AZTO), indium-aluminum-zinc-tin oxide (IAZTO), or indium-zinc-tin oxide (IZTO). The above-enumerated transparent conductors may have a predetermined level of light transmittance on their own and may undergo a printing or deposition process to form the conductive wires 533 in a few micrometers of line width on one (or both) surface of the dielectric substrate 507.

With reference to FIG. 11, when forming the mesh grid 534, a portion 535 of the mesh grid may be electrically disconnected (opened) from the rest thereof to be utilized as the coil 503. The electrical disconnection (opening) may be implemented by removing the transparent conductor forming the conductive wires 533 from another portion 536 of the mesh grid 534 at the edge of the portion 535 of the mesh grid. The portion 535 of the mesh grid may form the coil 503 and allow current to flow in the first direction. The portion 535 of the mesh grid may be electrically connected with a second outer coil 532, and the second outer coil 532 may be electrically connected with a first outer coil 531. The first outer coil 531 may receive power from a circuit device to allow current to flow via the second outer coil 532 to the portion 535 of the mesh grid.

Further, the coil 503 may be electrically connected with the bezel 151 shown in FIG. 1 as described in connection with the prior embodiment, thereby reducing the occurrence of second magnetic field from the metallic bezel 151.

As described above, according to an embodiment of the present disclosure, an electronic device may comprise a housing formed of a conductive material and a coil provided adjacent to the housing and generating a flow of current along a first direction, wherein the coil may be electrically connected with the housing to generate a flow of current in a direction parallel with the first direction from a portion of the housing.

According to an embodiment of the present disclosure, the electronic device may further comprise a first connecting portion connecting the coil with the housing to allow a current to flow from the coil to the housing and a second connecting portion connecting the coil with the housing to allow a current to flow from the housing to the coil, wherein the current from the housing may flow from the first connecting portion to the second connecting portion along the first direction.

According to an embodiment of the present disclosure, the electronic device may further comprise an insulator for insulating the first connecting portion from the second connecting portion in a remaining portion of the housing.

According to an embodiment of the present disclosure, a length of the housing from the second connecting portion to the first connecting portion along the first direction may be smaller than a length of the housing from the first connecting portion to the second connecting portion along the first direction.

According to an embodiment of the present disclosure, the second connecting portion may be disposed adjacent to the first connecting portion.

According to an embodiment of the present disclosure, the electronic device may further comprise a dielectric substrate mounted on the housing and a mesh grid including conductive wires formed on at least one surface of the dielectric substrate, wherein the coil may include a portion of the mesh grid that partially disconnects the conductive wires to be insulated from another portion.

According to an embodiment of the present disclosure, the coil may include an outer coil provided at an outer side of the mesh grid to electrically connect with a portion of the mesh grid.

According to an embodiment of the present disclosure, the dielectric substrate may include a transparent or opaque film, and the conductive wires may include a conductor.

According to an embodiment of the present disclosure, the conductor may include at least one of copper (Cu), graphene, nanowire, indium-tin oxide (ITO), indium-zinc oxide (IZO), aluminum-zinc oxide (AZO), Ga-doped zinc oxide (GZO), zinc-tin oxide (ZTO), aluminum-zinc-tin oxide (AZTO), indium-aluminum-zinc-tin oxide (IAZTO), and indium-zinc-tin oxide (IZTO).

According to an embodiment of the present disclosure, the electronic device may further comprise a display device, and the dielectric substrate may be disposed on the display device.

According to an embodiment of the present disclosure, the electronic device may further comprise a touchscreen panel disposed on the display device, and the touchscreen panel may be disposed to face the display device with the dielectric substrate disposed therebetween.

According to an embodiment of the present disclosure, the electronic device may further comprise a wearing portion connected with the housing to allow the housing to be worn on a user's body.

According to an embodiment of the present disclosure, the electronic device may further comprise a display device, and the coil may be disposed adjacent to an edge of the display device.

According to an embodiment of the present disclosure, the electronic device may further comprise a touchscreen panel disposed on the display device, and the touchscreen panel may be disposed to face the display device with the coil disposed therebetween.

According to an embodiment of the present disclosure, the electronic device may further comprise a touchscreen panel disposed on the display device, and the coil may be disposed to face the display device with the touchscreen panel disposed therebetween.

According to an embodiment of the present disclosure, in the electronic device, the coil may be disposed on the display device.

According to an embodiment of the present disclosure, the coil may be disposed along an inner surface of the housing while spaced apart from the inner surface of the housing.

According to an embodiment of the present disclosure, an electronic device may comprise a housing formed of a conductive material and a coil provided adjacent to the housing and generating a flow of current along a first direction, wherein the coil may be electrically connected with the housing to suppress a current generated from the housing in an opposite direction of the first direction.

While the inventive concept has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device comprising:
a housing comprising a conductive material;
a coil disposed along an inner surface of the housing, the coil being configured to generate a flow of current along a first direction in the coil;
a first connecting portion connecting the coil with the housing to allow a current to flow from the coil to the housing; and
a second connecting portion connecting the coil with the housing to allow the current to flow from the housing to the coil,
wherein the coil is electrically connected with the housing to generate a flow of current in a direction parallel with the first direction in a portion of the housing,
wherein the flow of current generated in the coil is formed inside the flow of current generated in the portion of the housing, and
wherein the current from the portion of the housing flows from the first connecting portion to the second connecting portion along the first direction, and a current from other portion of the housing flows from the first connecting portion to the second connecting portion along a second direction opposite to the first direction.

2. The electronic device of claim 1, further comprising an insulator for insulating the first connecting portion from the second connecting portion in a remaining portion of the housing.

3. The electronic device of claim 1, wherein a length of the housing from the second connecting portion to the first connecting portion along the first direction is smaller than a length of the housing from the first connecting portion to the second connecting portion along the first direction.

4. The electronic device of claim 1, wherein the second connecting portion is adjacent to the first connecting portion.

5. The electronic device of claim 1, further comprising:
a dielectric substrate mounted on the housing; and
a mesh grid including conductive wires formed on at least one surface of the dielectric substrate,
wherein the coil includes a portion of the mesh grid that partially disconnects the conductive wires to be insulated from another portion thereof.

6. The electronic device of claim 5, wherein the coil comprises an outer coil provided at an outer side of the mesh grid to electrically connect with a portion of the mesh grid.

7. The electronic device of claim 5,
wherein the dielectric substrate comprises a transparent or opaque film, and
wherein the conductive wires include a conductor.

8. The electronic device of claim 7, wherein the conductor comprises at least one of copper (Cu), graphene, nanowire, indium-tin oxide (ITO), indium-zinc oxide (IZO), aluminum-zinc oxide (AZO), Ga-doped zinc oxide (GZO), zinc-tin oxide (ZTO), aluminum-zinc-tin oxide (AZTO), indium-aluminum-zinc-tin oxide (IAZTO), and indium-zinc-tin oxide (IZTO).

9. The electronic device of claim 5, further comprising:
a display device,
wherein the dielectric substrate is disposed on the display device.

10. The electronic device of claim 5, further comprising:
a touchscreen panel disposed on the display device,
wherein the touchscreen panel is disposed to face the display device with the dielectric substrate disposed therebetween.

11. The electronic device of claim 1, further comprising a wearing portion connected with the housing to allow the housing to be worn on a user's body.

12. The electronic device of claim 11, further comprising:
a display device,
wherein the coil is disposed adjacent to an edge of the display device.

13. The electronic device of claim 12, further comprising:
a touchscreen panel disposed on the display device,
wherein the touchscreen panel is disposed to face the display device with the coil disposed therebetween.

14. The electronic device of claim 12, further comprising:
a touchscreen panel disposed on the display device,
wherein the coil is disposed to face the display device with the touchscreen panel disposed therebetween.

15. The electronic device of claim 12, wherein the coil is disposed on the display device.

16. The electronic device of claim 1, wherein the coil is disposed along an inner surface of the housing while spaced apart from the inner surface of the housing.

17. The electronic device of claim 1, wherein the housing comprises a metallic material.

18. The electronic device of claim 1, wherein the housing comprises a non-metallic material.

19. An electronic device comprising:
a housing comprising a conductive material;
a coil disposed along an inner surface of the housing, the coil being configured to generate a flow of current along a first direction;
a first connecting portion connecting the coil with the housing to allow a current to flow from the coil to the housing; and
a second connecting portion connecting the coil with the housing to allow the current to flow from the housing to the coil,
wherein the coil is electrically connected with the housing to suppress a current generated from the housing in an opposite direction of the first direction,
wherein the flow of current generated in the coil is formed inside the flow of current generated in the portion of the housing, and
wherein the current from the portion of the housing flows from the first connecting portion to the second connecting portion along the first direction, and a current from other portion of the housing flows from the first connecting portion to the second connecting portion along a second direction opposite to the first direction.

* * * * *